(12) United States Patent
Kern

(10) Patent No.: US 6,175,200 B1
(45) Date of Patent: *Jan. 16, 2001

(54) DEVICE FOR OPERATING A GAS DISCHARGE LAMP WITH REDUCED AVERAGE LAMP POWER

(75) Inventor: Robert Kern, Sasbachwalden (DE)

(73) Assignee: Robert Bosch GmbH, Stuttgart (DE)

(*) Notice: This patent issued on a continued prosecution application filed under 37 CFR 1.53(d), and is subject to the twenty year patent term provisions of 35 U.S.C. 154(a)(2).

Under 35 U.S.C. 154(b), the term of this patent shall be extended for 0 days.

(21) Appl. No.: 08/669,351
(22) PCT Filed: Oct. 11, 1995
(86) PCT No.: PCT/DE95/01394
  § 371 Date: Jul. 2, 1996
  § 102(e) Date: Jul. 2, 1996
(87) PCT Pub. No.: WO96/14725
  PCT Pub. Date: May 17, 1996

(30) Foreign Application Priority Data

Nov. 8, 1994 (DE) .................................................. 44 39 812

(51) Int. Cl.$^7$ ............................ H05B 41/00; H05B 41/14
(52) U.S. Cl. ............................ 315/307; 315/291; 315/82; 307/10.8
(58) Field of Search ............................ 315/307, DIG. 5, 315/247, 76, 82; 307/10.1, 10.8

(56) References Cited

U.S. PATENT DOCUMENTS 5,498,935 * 3/1996 Nakamura ............................ 315/205

FOREIGN PATENT DOCUMENTS 4136486    5/1993 (DE) .

* cited by examiner

*Primary Examiner*—Arnold Kinkead
(74) *Attorney, Agent, or Firm*—Venable; Norman N. Kunitz

(57) ABSTRACT

A device for operating a gas discharge lamp (13), with the device including an energy supply circuit which provides an alternating-current voltage ($U_L$) or an alternating current ($I_L$) having a predetermined period ($T_N$) during operation at normal rating in order to feed the gas discharge lamp (13) with a predetermined electrical power. When the average lamp power is reduced with respect to operation at normal rating, an extension of the period ($T_{R11}+T_{R12}$, $T_{R21}+T_{R22}$) is provided. The amount of the extension of the period ($T_{R11}+T_{R12}$, $T_{R22}+T_{R22}$) is a function of the amount of the reduction in power. The device of the invention for operating the gas discharge lamp (13) extensively prevents an extinguishing of the light arc located in the gas discharge lamp (13) during the pole-reversal process, and therefore assures re-ignition following the pole-reversal process, even during operation with reduced power. A preferred use of the device of the invention is in a gas discharge lamp installed in a motor vehicle.

8 Claims, 1 Drawing Sheet

DEVICE FOR OPERATING A GAS DISCHARGE LAMP WITH REDUCED AVERAGE LAMP POWER

STATE OF THE ART

The invention is based on a device for operating a gas discharge lamp of the type having an energy supply circuit which provides an alternating-current voltage or an alternating current normally having a predetermined period in order to feed the gas discharge lamp with a predetermined power defined in the main claim. A circuit arrangement for operating a gas discharge lamp is known from DE-A 41 36 486 which includes a voltage transformer that converts the energy provided by a direct current source into an alternating-current voltage of suitable height and frequency. The voltage transformer includes a DC/DC converter and a downstream bridge circuit, in whose diagonal the gas discharge lamp is disposed. The DC/DC converter increases the voltage provided by a direct current source, which is configured as a battery, to a value sufficient to operate the gas discharge lamp. The bridge circuit operates as an inverse rectifier, and converts the direct-current voltage into a corresponding alternating-current voltage. The known circuit arrangement provides that, directly after ignition of the gas discharge lamp, the bridge circuit still does not operate as an inverse rectifier, and therefore acts upon the gas discharge lamp with the direct-current voltage generated by the DC/DC converter. Depending on a signal of a status determination device that emits a signal when the gas discharge lamp has ignited successfully, and depending on the time predetermined by a delay device, the inverse rectifier is controlled in such a way that the gas discharge lamp is acted upon by the provided alternating-current voltage. The previously observed extinguishing of the gas discharge lamp directly after ignition during the first zero crossings of the alternating current of the lamp is prevented by the known measure.

In subsequent operation with the alternating-current voltage, an instantaneous power reduction which can lead to a short-time reduction in the light arc, even in this operating state, occurs in the gas discharge lamp during each pole-reversal process. A sufficiently high operating frequency, an example of which would be a few hundred Hertz, ensures that the light arc is not completely extinguished during the brief zero crossing of the current. The voltage necessary to keep the light arc operating at normal rating after the pole-reversal process corresponds to the normal arc drop voltage of the gas discharge lamp. A reduction in the electrical power supplied to the gas discharge lamp leads to the occurrence of a complete breakdown of the light arc during the pole-reversal process. The energy supply circuit must therefore be capable of applying the necessary re-ignition voltage following the pole-reversal process. A reduction in the electrical power supplied to the gas discharge lamp is therefore possible to the extent that the energy supply circuit is capable of applying the re-ignition voltage.

It is therefore the object of the invention to provide a device for operating a gas discharge lamp that assures reliable operating of the gas discharge lamp in an operating phase with reduced power.

The object is accomplished by the features disclosed in the main claim.

SUMMARY AND ADVANTAGES OF THE INVENTION

The above object generally is achieved according to the present invention by a device for operating a gas discharge lamp, having an energy supply circuit which provides an alternating-current voltage or an alternating current normally having a predetermined period in order to feed the gas discharge lamp with a predetermined power, and circuit means responsive to a reduction of the average lamp power with respect to operation at normal rating, for causing an extension of the period of the lamp alternating-current voltage or the lamp alternating current.

The device according to the invention has the advantage that an increase in the output voltage is not necessary in order to achieve a higher re-ignition voltage. In accordance with the invention, it is provided that an extension of the period of the alternating-current lamp voltage or the alternating lamp current is provided when a reduction in the average lamp power occurs with respect to operation at normal rating. The reduction in re-ignition voltage through a lowering of the operating frequency could be attributed to the fact that a more intense heating of the lamp electrodes takes place, which leads to an increased electron emission.

Advantageous modifications and embodiments of the device of the invention ensue from the dependent claims.

An advantageous embodiment provides that the extension of the period is performed for each half-period. This measure results in a particularly simple embodiment of the device according to the invention, because only the operating frequency of the lamp is to be reduced. A change in a possibly predetermined mark-space ratio with an assumed rectangular voltage need not be undertaken.

Another advantageous embodiment provides that the amount of the extension of the period is a function of the amount of the provided reduction in power.

An advantageous modification relates to the energy supply circuit, which preferably includes a DC/DC converter that provides a direct-current voltage at its output which is converted into an alternating-current voltage in a subsequent bridge circuit in whose diagonal the gas discharge lamp is disposed.

An embodiment of this modification provides that the DC/DC converter is fed by a battery.

The modifications of the energy supply circuit provided in accordance with the invention permit the embodiment of a highly-efficient DC/DC converter that can have a significantly higher clock frequency internally that the alternating-current voltage acting upon the gas discharge lamp. The comparably low-frequency alternating-current voltage having a frequency of, for example, a few hundred Hertz is generated by corresponding actuation of the bridge circuit.

The device of the invention is particularly suited for operating a metal-doped, high-pressure gas discharge lamp, which is critical with respect to the consumption of a re-ignition voltage after the undesired extinguishing of the light arc. A preferred use of the high-pressure gas discharge lamp, particularly of the metal-doped, high-pressure gas discharge lamp, is in a headlight of a motor vehicle.

Further advantageous modifications and embodiments of the device of the invention for operating a gas discharge lamp ensue from further dependent claims and the following description.

DETAILED DESCRIPTION OF THE PREFERRED EMBODIMENTS

Figure 1:
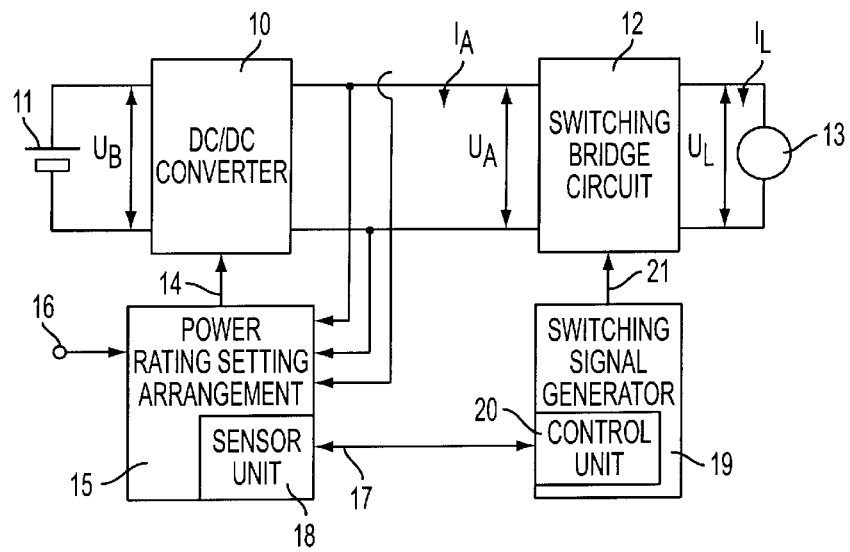
FIG. 1 shows a block diagram of a device of the invention.

FIG. 1 shows a voltage transformer 10 which converts an electrical power obtained from an energy source 11, which has a voltage $U_B$, into a corresponding output-side power having a predetermined output voltage $U_A$ or a predetermined output current $I_A$. The output voltage $U_A$ is supplied to a bridge circuit 12, at whose output a lamp voltage $U_L$ appears which is provided to feed a gas discharge lamp 13. A lamp current that flows through the gas discharge lamp 13 is indicated by $I_L$.

The voltage transformer 10 receives a control signal 14 that is provided by a power-rate-setting arrangement 15. The power-rate-setting arrangement 15 provides the control signal 14 as a function of a power rate setting 16, the detected output current $I_A$ and the detected output voltage $U_A$. The power-rate-setting arrangement 15, via unit 18, transmits a power reduction signal 17 to unit 20 to a switch-signal-generating element 18, which provides a switch signal 21 for the bridge circuit 12.

Figure 2:
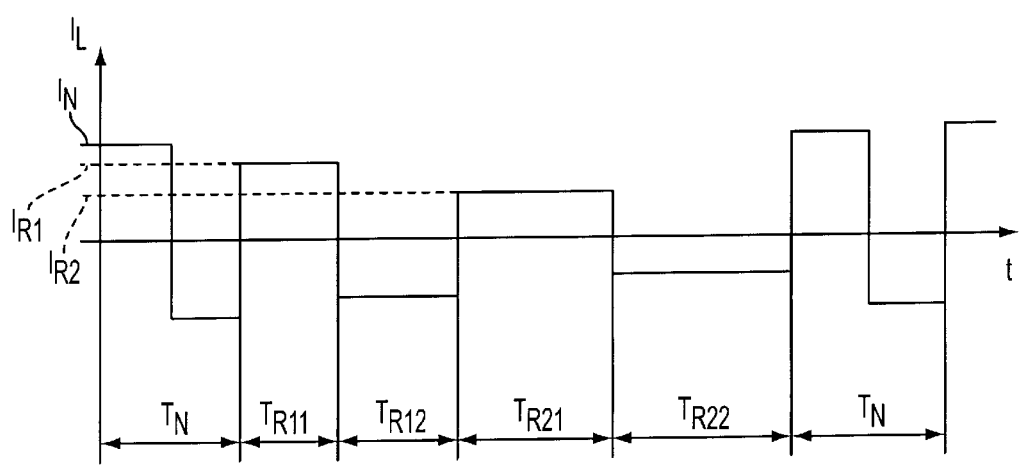
FIG. 2 shows, in a block diagram according to FIG. 1, a signal course occurring as a function of time.

FIG. 2 shows the lamp current $I_L$ as a function of the time t. The lamp current $I_L$ has an at least approximately rectangular signal course; in operation at normal rating, the period is set at $T_N$. A reduced-power operation, in which a reduced lamp current $I_R$ is provided, exists in addition to operation at normal rating. FIG. 2 shows two discrete current levels $I_{R1}$, $I_{R2}$, which occur during reduced-power operation. Operation with reduced power occurs during the periods not indicated by $T_N$. Consequently, reduced-power operation takes place during the illustrated half-periods $T_{R12}$, $T_{R12}$, $T_{R21}$, $T_{R22}$.

The device shown in FIG. 1 is described in detail in conjunction with the course of the lamp current IL shown in FIG. 2, as a function of the time t:

The voltage transformer 10, the bridge circuit 12 as well as the power rate-setting arrangement 15 and the switch-signal-generating element 19 together form an energy supply circuit for the gas discharge lamp 13. The voltage transformer 10, which is preferably configured as a DC/DC converter, converts the power obtained from the energy source 11, preferably a battery, into a predetermined output voltage $U_A$ and/or a predetermined output current $I_A$. In the case of a battery, the voltage of the energy source 11 is set with $U_B$. The voltage transformer 10 converts the voltage $U_B$ of the energy source 11, which is generally low, into a generally higher output voltage $U_A$. The embodiment of the voltage transformer 10 as a DC/DC converter has the significant advantage that a highly-efficient conversion of the voltage can be effected with the clock frequency of the DC/DC converter being able to be set independently of other signal frequencies of the energy supply circuit.

The downstream bridge circuit 12 has the task of converting the direct-current voltage $U_A$ into a lamp voltage $U_L$ suitable for feeding the gas discharge lamp 13. An alternating-current voltage that prevents material transport effects in the gas discharge lamp and a non-uniform electrode wear is suitable. The bridge circuit 12 includes, for example, four semiconductor power elements that are connected as an H-bridge in whose diagonal the gas discharge lamp 13 is disposed. The bridge circuit 12 is controlled or switched by the switch signal the switch 21 of signal generating element 19 in such a way that the output voltage $U_A$ of the voltage transformer 10 is applied to the two electrodes of the gas discharge lamp 13 with alternating polarity. The switch signal 21 determines the frequency, which lies at, for example, a few hundred Hertz.

The voltage transformer 10 can either impress the output voltage $U_A$ or the output current $I_A$ of a gas discharge lamp 13 as a load. The respectively other value is determined by the internal resistance of the gas discharge lamp 13. The output current $I_A$ is preferably impressed, because the gas discharge lamp 13 is designed for specific currents. The output current $I_A$ corresponds in amount to the lamp current $I_L$. The output voltage $U_A$ and lamp voltage $U_L$ likewise correspond in amount.

The power-rate-setting arrangement 15, which transmits a corresponding control signal 14 to the voltage transformer 10, is provided for setting a specific power. For the power to be set, the power-rate-setting arrangement 15 receives a signal as a nominal value from the power-rate setting 16. The actual power value is determined from the detected output voltage $U_A$ and the detected output current $I_A$. The necessary sensors are not shown in FIG. 1.

During operation at normal rating of the gas discharge lamp 13, the amplitude of the lamp current $I_L$ is at, for example, the value of the nominal current $I_N$ shown in FIG. 2. The lamp current $I_L$ preferably has an at least approximately rectangular signal course having a period $T_N$ which is predetermined by the switch signal 21.

During the pole-reversal process, in which the lamp current $I_L$ and the lamp voltage $U_L$ have a zero crossing, a more or less pronounced reduction in the light arc occurring in the gas discharge lamp 13 takes place as a function of the present operating data of the gas discharge lamp 13. In an extreme case, a complete extinguishing of the light arc can take place following a pole-reversal process. During operation at normal rating of the gas discharge lamp 13, in which the nominal current $I_N$ flows, for example, generally no notable increase in the re-ignition voltage takes place after the pole-reversal process. In order to assure reliable re-ignition of the lamp following a pole-reversal process, even in operation with reduced power of the gas discharge lamp 13, an extension of the period of the lamp voltage $U_L$ or the lamp current $I_L$ is provided in accordance with the invention. It was determined experimentally that, in comparison to normal operation, the re-ignition voltage does not increase, or only increases insignificantly, during operation with reduced power and an extension of the period. This can be attributed to the fact that the electrodes of the gas discharge lamp 13 reach a higher temperature during a longer period. A higher electrode temperature results in a higher electron emission.

The information that operation with reduced power is taking place is imparted to the switch-signal generating element 19 by way of the power-reduction signal 17. The power-reduction signal 17 is derived, for example, directly from the power-rate-setting 16, in the power-rate-setting arrangement 15. When the power is decreased, the switch-signal-generating element 19 increases the period of the switch signal 21. FIG. 2 shows a first current level $I_{R1}$, which can occur during a first reduction in power. The period during operation with the first reduced current level $I_{R1}$ can be determined from the addition of the half-periods $T_{R11}$, $T_{R12}$ in FIG. 2. An essential feature of the invention is that the half-periods $T_{R11}$, $T_{R12}$ are extended with respect to the corresponding half-period $T_N/2$ of operation at normal rating. It can be seen from FIG. 2 that the half-periods $T_{R11}$, $T_{R12}$ need not necessarily be of identical length. A change in the mark-space ratio can certainly be effected simultaneously with the extension of the periods $T_{R12}$, $T_{R12}$. The mark-space ratio is preferably kept constant, and only the period which results from the addition of the two half-periods $T_{R11}$, $T_{R12}$ is increased. A short-time, variable mark-space ratio can result as a function of the constructional circuitry embodiment of the switch signal generating element 19 with transient procedures that occur during a change in power. FIG. 2 shows a further current level $I_{R2}$, which can occur in the event of a further power reduction.

Corresponding to the further power reduction, the period which can be obtained from the addition of the two half-periods shown, $T_{R21}$, $T_{R22}$, is also extended. After the half-period $T_{R22}$, has ended, the operation initiated with the nominal current $I_N$ is set again with nominal power. Correspondingly, the period is again identical to the identical value of the period $T_N$ of operation at normal rating. Instead of the direct transition from reduced power to the higher power shown in FIG. 2, a gradual increase in power with a correspondingly gradual shortening of the period can be provided. The amount of the extension is preferably dependent on the extent of the power reduction.

A metal-doped, high-pressure gas discharge lamp is provided as an example of a gas discharge lamp 13. This type of gas discharge lamp is suited as a headlight lamp used, for example, in a motor vehicle.

What is claimed is:

1. A device for operating a gas discharge lamp, having an energy supply circuit which provides a lamp alternating-current voltage or a lamp alternating current normally having a predetermined period in order to feed the gas discharge lamp with a predetermined power, and circuit means responsive to a reduction of the average lamp power with respect to the operation at normal rating, for causing an extension of the period $(T_{R11}+T_{R12},+T_{R25}+T_{R22})$ of the lamp alternating-current voltage $(U_L)$ or the lamp alternating current $(I_L)$.

2. A device according to claim 1, wherein each half-period $((T_{R11,}\ _{TR12};\ T_{R21},\ T_{R22})$ is extended.

3. A device according to claim 1, wherein in the circuit means effects the power reduction by reducing the lamp current $(I_L)$ from a nominal current $(I_N)$ to a reduced level $(I_{R1},\ I_{R2})$.

4. A device according to claim 1, wherein the amount of the extension of the period $(T_{R11}+T_{R12},\ T_{R21}+T_{R22})$ is a function of the extent of the reduction in power.

5. A device according to claim 1, wherein the energy supply circuit includes a voltage transformer having a direct-current output and a subsequent bridge circuit in whose diagonal the gas discharge lamp is disposed.

6. A device according to claim 5, wherein a battery is provided as an energy source and the voltage transformer is a DC/DC converter.

7. A device according to claim 1, wherein a metal-doped, high-pressure gas discharge lamp is provided as the gas discharge lamp.

8. A device according to claim 7, wherein the gas discharge lamp is a lamp in a motor vehicle.

* * * * *